US007513418B2

(12) United States Patent
Dragt et al.

(10) Patent No.: US 7,513,418 B2
(45) Date of Patent: Apr. 7, 2009

(54) SYSTEMS AND METHODS FOR PERFORMING A SIMPLIFIED RISK ASSESSMENT

(75) Inventors: Bruce Dragt, Highlands Ranch, CO (US); Daniel Ahles, Houston, TX (US)

(73) Assignee: First Data Corporation, Greenwood Village, CO (US)

(*) Notice: Subject to any disclaimer, the term of this patent is extended or adjusted under 35 U.S.C. 154(b) by 251 days.

(21) Appl. No.: 11/313,601

(22) Filed: Dec. 20, 2005

(65) Prior Publication Data

US 2007/0138257 A1    Jun. 21, 2007

(51) Int. Cl.
*G06Q 40/00*    (2006.01)
(52) U.S. Cl. .................. 235/379; 235/380; 705/38; 705/39; 705/40; 705/44; 705/75
(58) Field of Classification Search ............... 235/379; 705/44
See application file for complete search history.

(56) References Cited

U.S. PATENT DOCUMENTS

| 5,237,620 | A | * | 8/1993 | Deaton et al. ............... 705/10 |
| 5,679,938 | A | | 10/1997 | Templeton et al. |
| 5,679,940 | A | * | 10/1997 | Templeton et al. ......... 235/380 |
| 5,930,777 | A | | 7/1999 | Barber |
| 6,505,772 | B1 | | 1/2003 | Mollett et al. |
| 6,547,132 | B1 | | 4/2003 | Templeton et al. |
| 6,581,043 | B1 | | 6/2003 | Wallin et al. |
| 2003/0093368 | A1 | | 5/2003 | Manfre et al. |
| 2003/0130919 | A1 | | 7/2003 | Templeton et al. |
| 2003/0187796 | A1 | * | 10/2003 | Swift et al. ................ 705/45 |
| 2003/0216987 | A1 | | 11/2003 | Mollett et al. |
| 2003/0216988 | A1 | | 11/2003 | Mollett et al. |
| 2003/0217014 | A1 | | 11/2003 | Mollett et al. |
| 2003/0225686 | A1 | | 12/2003 | Mollett et al. |
| 2004/0199462 | A1 | * | 10/2004 | Starrs ...................... 705/39 |
| 2005/0283429 | A1 | * | 12/2005 | Bates et al. ................ 705/38 |
| 2006/0229996 | A1 | * | 10/2006 | Keithley et al. ............ 705/75 |

FOREIGN PATENT DOCUMENTS

| WO | WO 01/97134 A1 | 12/2001 |
| WO | WO 03/042790 A2 | 5/2003 |
| WO | WO 03/083751 A1 | 10/2003 |
| WO | WO 03083751 A1 * | 10/2003 |

* cited by examiner

*Primary Examiner*—Michael G Lee
*Assistant Examiner*—Kristy A Haupt
(74) *Attorney, Agent, or Firm*—Sutherland Asbill & Brennan LLP

(57) ABSTRACT

Systems and methods are provided for a simplified risk assessment for a promissory transaction when sufficient historical transaction information exists for the check writer. In an embodiment, a computerized method for determining authorization of a financial transaction comprises maintaining a historical transaction value for past transactions associated with related promissory payments, receiving a request from a merchant to determine authorization of a financial transaction associated with a proffered promissory payment, the proffered promissory payment having at least one transaction identifier, accessing the historical transaction value associated with the related promissory payments, and determining based on the historical transaction value whether to authorize the financial transaction based a risk score or whether to authorize the financial transaction based on data stored in a negative database.

20 Claims, 3 Drawing Sheets

SYSTEMS AND METHODS FOR PERFORMING A SIMPLIFIED RISK ASSESSMENT

BACKGROUND OF THE INVENTION

1. Field of the Invention

This invention relates to risk assessment, and more particularly to systems and methods for evaluating risks associated with financial transactions.

2. Description of the Related Art

Many financial transactions involve a customer making a payment to a merchant in exchange for goods or services. Many times the payment is in a promissory form, such as a check that instructs the customer's bank to pay the merchant from a demand deposit account (DDA). A DDA is an account, such as a checking account, whose balance can be drawn upon on demand without prior notice. As is well known, the funds promised by the check are sometimes not paid, due to reasons such as insufficient funds in the customer's checking account or fraud. Examples of fraud include, but are not limited to, payments made with checks or debit cards that are stolen, counterfeit, or written for accounts that no longer exist. Thus, although it may be considered good business practice for a merchant to accept promissory DDA payments, the merchant is taking a risk whenever a check or other promissory DDA payment is accepted in exchange for goods or services.

In order to manage these and other financial transaction risks, some merchants subscribe to a service that assesses risks associated with financial transactions. For a given check transaction, a subscribed merchant can send a point-of-sale transaction approval request to the service with information, such as check amount, account identification, and check-writer identification. The service assesses the risk and either authorizes or declines the transaction based on the risk assessment.

In order to assess a transaction risk, the service typically calculates a risk score by inputting information about the check, the check writer, and the merchant into one or more algorithms. The algorithms return a risk score that is indicative of the transaction risk. A typical check approving process typically comprises a cutoff risk score such that a transaction whose risk score is higher than the cutoff risk score is authorized. Conversely, a transaction whose risk score is lower than the cutoff risk score is declined.

However, there are costs associated with performing the algorithms and calculating the risk score. Calculating the risk score consumes costly processor time. In addition, when the merchant has a high volume of transactions, calculating the risk score for each transaction can cause a significant delay in completing the transaction for the merchant and the customer.

SUMMARY OF THE INVENTION

Systems and methods are provided for a simplified risk assessment when sufficient historical transaction information exists for the check writer. In an embodiment, the simplified risk assessment comprises two stages that significantly reduce processing requirements. In a first stage, the simplified risk assessment system determines whether there is sufficient historical data associated with the checking account. In one embodiment, the first stage acts as a filter to remove from consideration those checking accounts that do not have enough historical transaction data to be eligible for the simplified risk analysis. If there is not enough historical transaction data associated with the checking account, the service performs a full authorization determination.

When there is sufficient historical data associated with the checking account, in a second stage, the risk assessment system performs a simplified authorization determination. In one embodiment, the simplified risk assessment system searches a negative database for any of the transaction identifiers associated with the transaction. Examples of transaction identifiers include, but are not limited to the checking account number associated with the promissory payment, the check writer's name, address, telephone number, driver's license number, social security number, or the like. If any of the transaction identifiers are found in the negative database, the transaction is not eligible for the simplified risk analysis. In an embodiment, when at least one transaction identifier is found in the negative database, the transaction is declined. In another embodiment, the service performs the full authorization determination when at least one transaction identifier is found in the negative database.

In one embodiment, a computerized method for determining authorization of a financial transaction comprises maintaining a historical transaction value for past transactions associated with related promissory payments, receiving a request from a merchant to determine authorization of a financial transaction associated with a proffered promissory payment, accessing the historical transaction value associated with the related promissory payments, and determining based on the historical transaction value whether to authorize the financial transaction based a risk score or whether to authorize the financial transaction based on data stored in a negative database.

In another embodiment, a computerized system for determining authorization of a financial transaction comprises an historical transaction value for past transactions associated with related promissory payments, a request from a merchant to determine authorization of a financial transaction associated with a proffered promissory payment, and an historical transaction filter which determines based on the historical transaction value whether to authorize the financial transaction based on a risk score or whether to authorize the financial transaction based on data stored in a negative database.

In a further embodiment, a computerized system for determining authorization of a financial transaction comprises means for maintaining a historical transaction value for past transactions associated with related promissory payments, means for receiving a request to determine authorization of a financial transaction associated with a proffered promissory payment, means for accessing the historical transaction value associated with the related promissory payments, and means for determining based on the historical transaction value whether to authorize the financial transaction based a risk score or whether to authorize the financial transaction based on data stored in a negative database.

For purposes of summarizing the invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION OF THE PREFERRED EMBODIMENT

Figure 1:
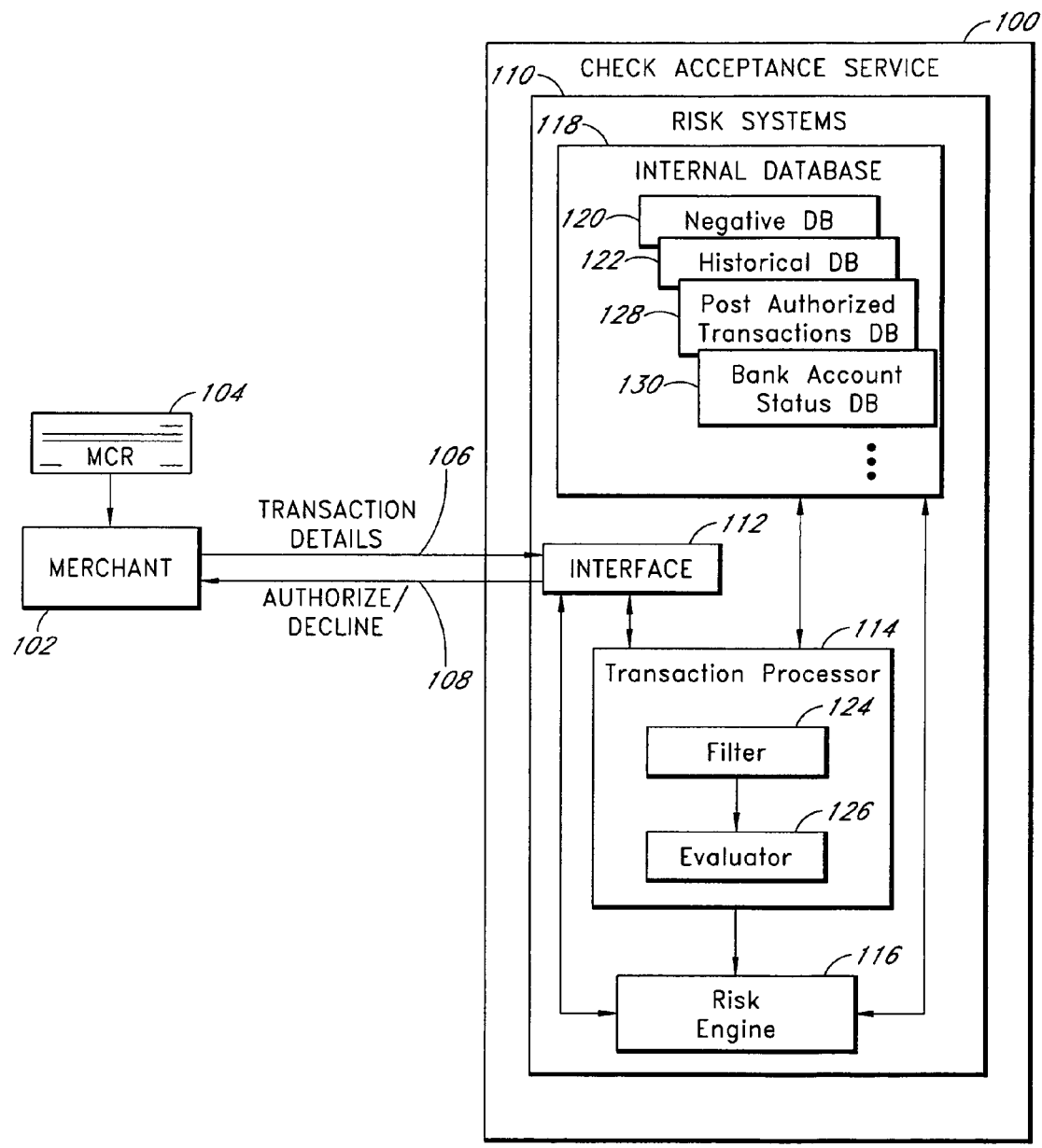
FIG. 1 illustrates a functional block diagram of an embodiment of a risk analysis system where the risk analysis system can perform a simplified risk assessment.

FIG. 1 illustrates a functional block diagram of an embodiment of a check acceptance service or agency 100, illustrating the interaction with a merchant 102 for accessing the risk associated with a promissory transaction. In FIG. 1, the merchant 102 receives a promissory payment, such as a check 104 proffered from a customer for the payment of goods or services. The merchant 102 interacts with the check acceptance service 100 to determine if the check 104 will be accepted or not. The interaction comprises transaction information details 106 submitted by the merchant 102 to the check acceptance service 100 and an authorize/decline decision 108 sent by the check acceptance service 100 to the merchant 102.

The transaction details or identifiers 106 comprise, but are not limited to the merchant identification number, the check number, the check amount, the date and time of the transaction, the bank number, the magnetic ink character recognition (MICR) number, the check writer's name, address, drivers license number, social security number, and the like.

The interaction between the merchant 102 and the check acceptance service 100 takes place, in one embodiment, using a communications medium, such as the Internet, which is a global network of computers. In other embodiments, the communications medium can be any communication system, including, by way of example, dedicated communications lines, telephone networks, wireless data transmission systems, two-way cable systems, customized computer networks, interactive kiosk networks, automatic teller machines networks, and the like.

In FIG. 1, the check acceptance service 100 comprises a risk system 110 that evaluates the risk involved with a given financial transaction and that may be advantageously implemented with program logic. In one embodiment, the program logic may be implemented as one or more modules. The modules may be advantageously configured to execute on one or more processors. The modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, or variables.

The risk system 110 comprises an interface 112 for interfacing with the merchant 102. The risk system 110 further comprises a transaction processor 114 that performs a simplified risk determination for the transaction, a risk engine 116 that can calculate a risk score for the transaction, and one, or more internal database collections 118 that comprise stored data.

To aid in making the risk determination, the transaction processor 114 and the risk engine 116 can access additional information from the one or more internal database collections 118 to retrieve stored information associated with the check writer, the merchant and/or other relevant information. The internal database collection 118 can comprise one or more logical and/or physical data storage systems for storing data used by the transaction processor 114 and the risk engine 116, and can comprise one or more separate databases and/or storage systems or networks of storage systems.

In an embodiment, the internal database collection comprises information regarding previously accepted "bad" checks, which can be known as a negative database 120. Consulting the negative database 120 allows the transaction processor 114 and the risk engine 116 to identify check writers who have a history of writing "bad" checks.

In another embodiment the internal database collection 118 comprises an historical transaction database 122, which advantageously stores information associated with the check writer's financial history and can include transaction data from transactions processed by the transaction processor 114, the risk engine 116, other systems, credit reporting companies, or other commercially available databases. Consulting the historical transaction database 122 allows the simplified transaction processor 114 to determine an amount of financial transaction history for the check writer and/or the checking account associated with the financial transaction.

In other embodiments, the internal database collection 118 comprises a past authorized transaction database 128, which provides an indication of whether funds were available for a previously approved transaction associated with past promissory payments related to the proffered promissory payment, and a bank account status database 130, which provides the status of the account associated with the proffered promissory payment. In an embodiment, the bank account status database 130 is provided by a third party.

In other embodiments, the internal database collection 118 comprises a merchant database which stores information associated with the merchant 102, such as, but not limited to the merchant code, additional transaction authorization rules specified by the merchant 102, whether the merchant 102 has authorized the use of a simplified risk assessment process for promissory transactions, whether the merchant 102 has authorized the use of the past authorized transactions database 128, whether the merchant102 has authorized the use of the bank account status database 130, the merchant name, business name, address, business type, and the like.

In FIG. 1, the interface 112 receives the transaction information details 106 from the merchant 102 and passes the information to the transaction processor 114. The transaction processor 114 determines if the transaction meets the criteria to evaluate the risk of the transaction using a simplified risk analysis. When the transaction meets the criteria, the transaction processor 114 evaluates the risk of the transaction based on data stored in the negative database 120. The simplified risk analysis accesses the negative database 120 in the internal database collection 118 but does not calculate a risk score for the financial transaction. In an embodiment, the transaction processor 114 returns a decision to the interface 112, which in turn informs the merchant 102 of the authorize/decline decision 108.

When the transaction processor 114 determines that the transaction does not meet the criteria to evaluate the risk of the transaction using the simplified risk analysis, the interface 112 passes the transaction information details 106 to the risk engine 116. The risk engine 116 evaluates the risk of the transaction by performing a full risk determination. In an embodiment, the full risk determination comprises inputting at least one of the transaction details 106 into one or more algorithms in the risk engine 116 to calculate a risk score. The risk engine 116 can access the one or more internal databases 118 and one or more external databases to acquire additional information for processing in the algorithms. The risk engine 116 returns a decision based on the risk score to the interface 112, which in turn informs the merchant 102 of the authorize/decline decision 108.

In another embodiment, when the transaction processor 114 determines a decline decision 108 for the transaction based on data stored in the negative database 120, the interface 112 passes the transaction information details 106 to the risk engine 116. The risk engine 116 calculates the risk score and evaluates the transaction risk based on the risk score. The risk engine 116 returns a decision based on the risk score to the interface 112, which in turn informs the merchant 102 of the authorize/decline decision 108.

Referring to FIG. 1, the transaction processor 114 comprises an historical data filter 124. The transaction processor 114, using the historical data filter 124, determines whether to authorize the proffered promissory payment based on data stored in the negative database 120 or whether to authorize the proffered promissory payment based on the risk score.

The historical data filter 124 receives the transaction details 106, such as, but not limited to the merchant identification number, the check number, the check amount, the date and time of the transaction, the bank number, the MICR number, the check writer's name, address, drivers license number, social security number, a second source of funds, and the like from the interface 112 and accesses the historical transaction database 122 to determine whether sufficient transaction history exists for the check writer and/or the checking account. The historical transaction filter 124 filters those transactions where the check writer has insufficient check writing history from further processing by the transaction processor 114.

In an embodiment, the historical transaction filter 124 calculates a historical transaction score or value, which provides a numerical picture of the check writer's use of the financial transaction processing system. In an embodiment, the historical transaction value is preset to an initial value and is updated after each promissory transaction submitted to the check acceptance service 110 for risk analysis. In an embodiment, the historical transaction value is a positive/negative code.

In an embodiment, the historical transaction filter 124 comprises an historical transaction threshold. The historical transaction filter 124 compares the historical transaction score with the historical transaction threshold. A transaction whose historical transaction value meets or exceeds the threshold has sufficient transaction history. Authorization of transactions with sufficient transaction history can based on data stored in the negative database 120, and not based on the risk score.

Conversely, a transaction whose historical transaction value does not meet or is below the threshold has insufficient transaction history. For such transactions, the check acceptance service 100 authorizes the transaction based on the risk score calculated by the risk engine 116.

In another embodiment, the historical transaction score is compared to a set of acceptable values such that a transaction whose historical transaction score matches an acceptable value has sufficient transaction history and thus, can be authorized based on the data in the negative database 120. Conversely, a transaction whose historical transaction score matches an unacceptable value has insufficient transaction history and does not meet the criteria for the transaction risk to be determined using the simplified risk analysis.

When the historical transaction filter 124 determines that the transaction does not have sufficient transaction history, the transaction processor 114 passes the risk determination decision to the risk engine 116. The risk engine calculates the risk score and authorizes the financial transaction based on the risk score. The risk engine 116 sends an accept/decline decision 108 to the merchant 102 through the interface 112 based on the risk score.

The transaction processor 114 further comprises a negative database evaluator 126. When the historical transaction filter 124 determines that the transaction has sufficient transaction history, the historical transaction filter 124 passes the risk determination decision to the negative database evaluator 126. The negative database evaluator 126 accesses the negative database 120 to determine whether at least one of the transaction identifiers 106 is present in the negative database 120. In an embodiment, when the negative database 120 comprises at least one of the transaction identifiers 106, the transaction processor 114 transmits the decline decision 108 to the merchant 102 through the interface 112.

In an alternative embodiment, when the negative database 120 comprises at least one of the transaction identifiers 106, the transaction processor 114 passes the risk determination decision to the risk engine 116. The risk engine 116 calculates the risk score for the transaction. The risk engine 116 sends the accept/decline decision 108 based on the risk score to the merchant 102 through the interface 112.

Figure 2:
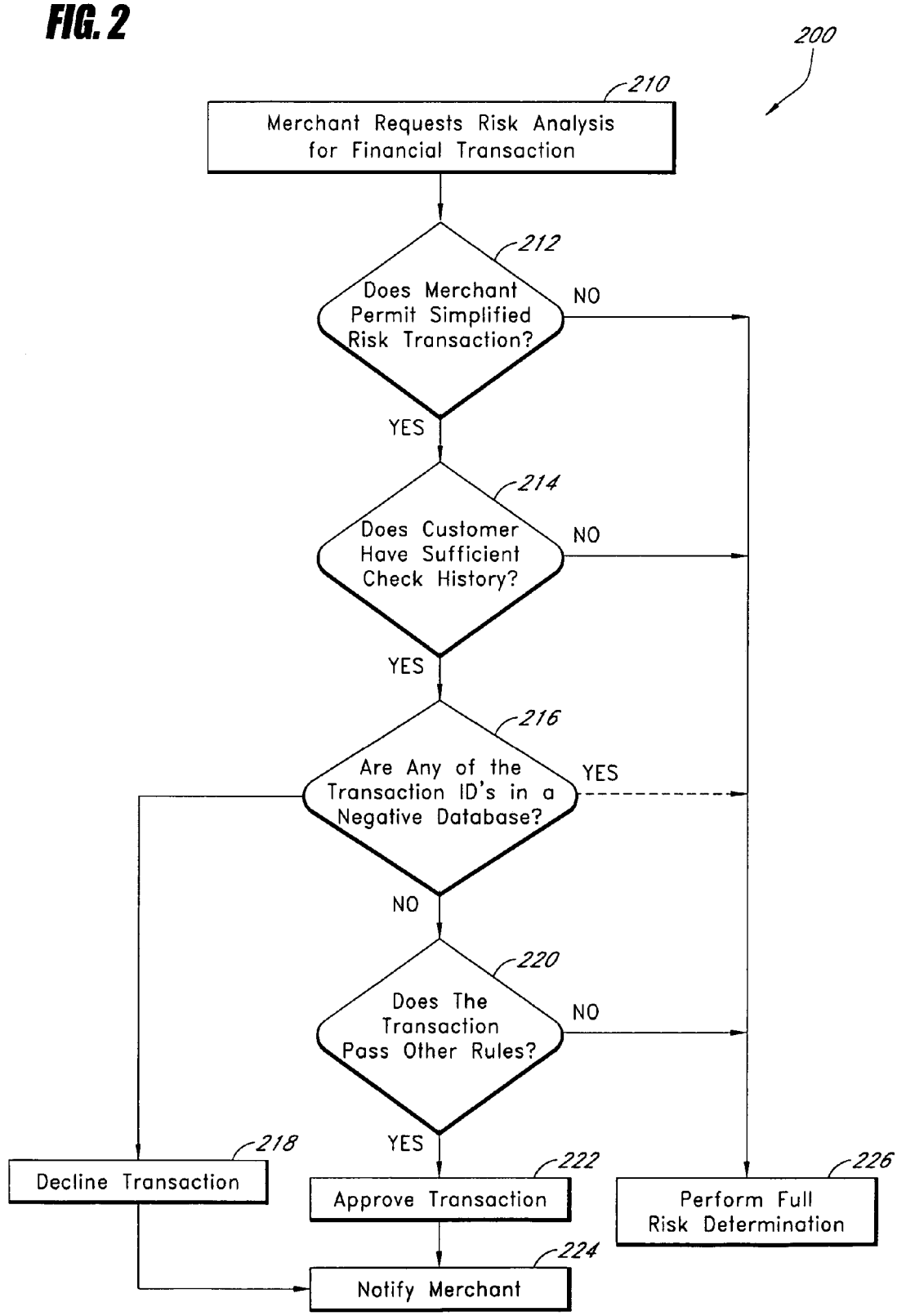
FIG. 2 is a flow chart of a simplified risk assessment process, according to an embodiment of the invention.

FIG. 2 is a flow chart of an embodiment of a simplified risk assessment process 200. In block 210, the merchant 102 requests a risk analysis for the financial transaction and submits the transaction details 106 to the check acceptance service 100. The transaction details or identifiers 106 comprise, but are not limited to the merchant identification number, the check number, the check amount, the date and time of the transaction, the bank number, MICR number, the check writer's name, address, driver's license number, social security number, and the like.

In block 212, the check acceptance service 100 determines whether the merchant 102 allows authorization of the financial transaction based on the data stored in the negative database 120 and not based on the risk score. In an embodiment, the check acceptance service 100 checks the merchant database to determine if the merchant 102 permits the simplified risk assessment process 200 to be used for the risk determination. In another embodiment, the check acceptance service 100 searches the merchant database for the merchant's identification number. The check acceptance service 100 then checks a simplified risk authorization indicator associated with the merchant's identification number in the merchant database to determine if the merchant 102 permits authorization of the transaction based on data stored in the negative database and not based on the risk score.

If the merchant 102 permits simplified risk processing based on the data stored in the negative database 120, the process 200 moves to block 214. If the merchant 102 does not permit simplified risk processing, the process 200 moves to block 226, where the check acceptance service 100 performs the full risk determination using the risk engine 116 to calculate the risk score associated with the financial transaction.

In block 214, the transaction processor 114 accesses the historical database 122 and calculates the historical transaction score. When the historical transaction score is greater than or matches an acceptable historical transaction value or threshold, the process 200 moves to block 216, where the transaction processor 114 accesses the negative database 120. When the historical transaction score is below or does not match an acceptable historical transaction value or threshold, the check writer does not have sufficient financial transaction history and the process 200 moves to block 226, where the check acceptance service 100 performs the full risk determination using the risk engine 116 to calculate the risk score.

In an embodiment, the acceptable historical value is one of a set of historical transaction values. In another embodiment, the historical transaction threshold or value is predetermined. In another embodiment, the historical threshold or value is determined during the calculation of the historical transaction score. In another embodiment, the historical transaction threshold or value is set by the merchant 102.

In block 216, the transaction processor 114 accesses the negative database 120 to determine whether at least one of the transaction details 106 are found in the negative database 120. If none of the transaction details 106 are stored in the negative database 120, the process 200 moves to block 220.

In an embodiment, when at least one of the transaction details 106 is stored in the negative database 120, the process 200 moves to block 226, where the check acceptance service 100 performs the full risk determination process using the risk engine 116 to calculate the risk score.

In another embodiment, when the negative database 124 comprises at least one of the transaction details 108, the process 200 moves to block 218, where the transaction processor 114 sends the decline decision 108 to the merchant 102 through the interface 112.

In another embodiment, the merchant 102 specifies additional rules or criteria that are applied to the transaction to determine whether to authorize the proffered promissory payment based on data stored in the negative database 120 or whether to authorize the proffered promissory payment based on the risk score. Examples of additional rules are described in further detail below in FIG. 3.

In block 220, the transaction processor 114 applies the additional rules to the transaction. If the transaction passes the additional rules, the process 200 moves to block 222, where the transaction processor 114 approves the transaction. In block 224, the merchant 102 is notified of the authorize decision 108.

If the transaction does not pass the additional rules, the process 200 moves to block 226, where the check acceptance service 100 performs the full risk assessment using the risk engine 116 to calculate the risk score. The merchant 102 receives the authorize/decline decision 108 based on the risk score.

Figure 3:
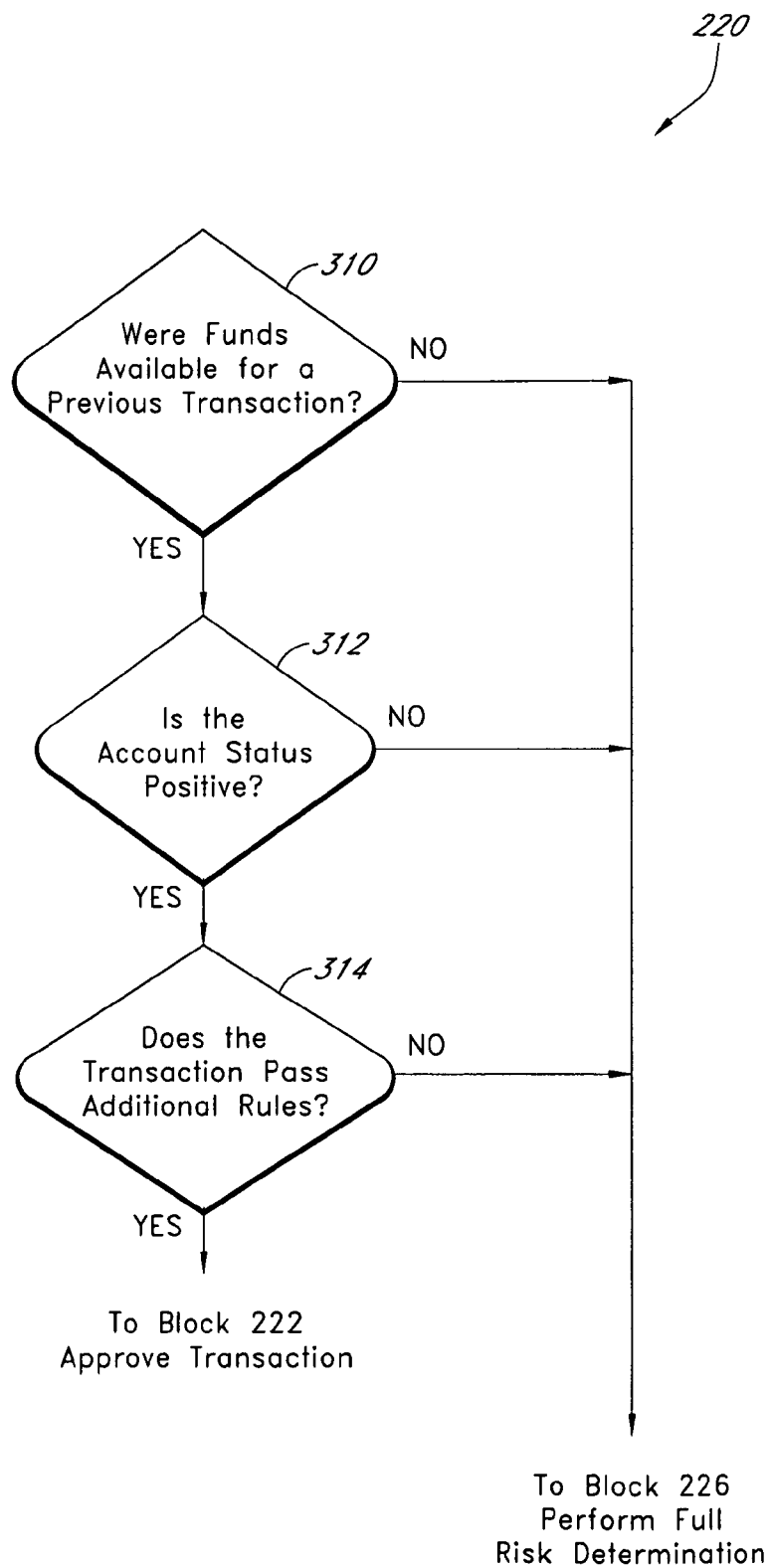
FIG. 3 is a flow chart of additional transaction rules of the simplified risk analysis process, according to an embodiment of the invention.

FIG. 3 is a flow chart of an embodiment of the optional transaction rules process 220. Additional transaction rules are requirements that the merchant 102 specifies. The check acceptance service 100 authorizes or declines the transaction based on data stored in the negative database 120 for transactions that pass the merchant's optional rules. The check acceptance service 100 authorizes or declines the transaction based the risk score calculated by the risk engine 116 for transactions that fail the merchant's optional rules.

In an embodiment, the merchant 102 can specify that the current transaction have a positive past authorized transaction status before authorizing the transaction based on data stored in the negative database 120. The check acceptance service 100 accesses the past authorized transaction database 128 and acquires a past authorized transaction status. The past authorized transaction status is an indication of the availability of funds for a previously approved transaction having at least one transaction identifier 106 in common with the current transaction. For example, the transaction has a positive past authorized transaction status if the funds existed in the check writer's bank for the previous transaction. Conversely, the transaction has a negative past authorized transaction status if the funds did not exist in the check writer's bank for the previous transaction. In an embodiment the past authorized transaction status is a second hour status.

In block 310, the transaction processor 114 determines the past authorized transaction status of the transaction. In an embodiment, the transaction processor 114 accesses the past authorized transaction database 128 in the database collection 118. When the past authorized transaction status is positive, the process 220 moves to block 312. When the past authorized transaction status is negative, the process 220 moves to block 226, where the check acceptance service 100 authorizes or declines the transaction based on the risk score calculated by the risk engine 116.

In an embodiment, the merchant 102 can specify that the promissory account associated with the transaction have a positive account status before authorizing or declining the transaction based on the data stored in the negative database 120, the bank account status database 130, or the like. The account status is an indication that the demand deposit account associated with the transaction is in good standing with the bank. For example, the account status is positive if the account exists, is open, and is not overdrawn. Conversely, for example, the account status is negative if the account is closed, if the account has been overdrawn for a period of time, or the like.

In block 312, the transaction processor 114 determines the account status of the promissory account associated with the proffered promissory payment. In an embodiment, the transaction processor 114 accesses the bank account status database 130, the negative database 120, or the like in the database collection 118 to determine the account status. When the account status is positive, the process 220 moves to block 314. When the account status is negative, the process 220 moves to block 226, where the check acceptance service 100 authorizes or declines the transaction based on the risk score calculated by the risk engine 116.

In the block 314, the transaction processor 114 evaluates additional merchant rules. The merchant 102 can specify that transactions over an amount or limit set by the merchant, such as $5,000, for example, are not eligible for the simplified transaction processing. In other examples, the merchant 102 specifies that transactions where the customer is from out of state or not local to the merchant are not eligible for authorization based on data stored in the negative database 120. The merchant 102 can specify that certain purchase items, such as, for example, televisions or jewelry, fail to qualify the transaction for the simplified risk assessment. Referring to block 214 in FIG. 2, the merchant 102 can set the historical transaction value.

When the transaction fails to meet at least one of the additional rules, the process moves to block 226, where the check acceptance service 100 authorizes or declines the transaction based on the risk score calculated by the risk engine 116.

When the transaction passes the additional rules, the process 220 moves to block 222, where the transaction processor 114 authorizes the transaction. Thus, the check acceptance service 100 has performed the simplified risk analysis and authorized the transaction based on the data stored in the negative database 120 without calculating the risk score.

In block 224, the check acceptance service 100 notifies the merchant 102 that the transaction is authorized, as described in FIG. 2.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

What is claimed is:

1. A computerized method for determining authorization of a financial transaction comprising:
    maintaining a historical transaction value for past transactions associated with related promissory payments;
    receiving, via a network, a request from a merchant to determine authorization of a financial transaction associated with a proffered promissory payment;
    determining whether the merchant has authorized simplified risk assessment;
    accessing the historical transaction value associated with the related promissory payments, when the merchant has authorized simplified risk assessment; and
    determining, based on the historical transaction value, to authorize the financial transaction based on absence of negative data for the customer associated with the promissory payment stored in a negative database when the merchant has authorized simplified risk assessment; or
    performing a more detailed risk assessment based on a plurality of factors associated with the financial transaction when the merchant has not authorized simplified risk assessment or when negative data associated with the customer appears in the negative database.

2. The method of claim 1 further comprising authorizing the financial transaction based on the data stored in the negative database when the historical transaction value meets a threshold.

3. The method of claim 1 further comprising authorizing the financial transaction based on the more detailed risk assessment that calculates a risk score for the proffered promissory payment when the historical transaction value does not meet a threshold.

4. The method of claim 1 further comprising authorizing the financial transaction based on the more detailed risk assessment that calculates a risk score for the proffered promissory payment when a value of the financial transaction exceeds a transaction limit set by the merchant.

5. The method of claim 1 further comprising determining based on criteria set by the merchant whether to authorize the financial transaction based the more detailed risk assessment or whether to authorize the financial transaction based on data stored in a negative database.

6. The method of claim 1 further comprising:
    maintaining an indication of whether funds were available for past authorized transactions associated with the related promissory payments;
    accessing the indication;
    authorizing the financial transaction based on the more detailed risk assessment, wherein the risk assessment calculates a risk score for the proffered promissory payment when the indication is negative; and
    authorizing the financial transaction based on data stored in the negative database when the indication is positive.

7. The method of claim 1 further comprising:
    accessing an account status of a promissory account associated with the proffered promissory payment;
    authorizing the financial transaction based on the more detailed risk assessment, wherein the risk assessment calculates a risk score for the proffered promissory payment when the account status is negative; and
    authorizing the financial transaction based on data stored in the negative database when the account status is positive.

8. A computerized system for determining authorization of a financial transaction comprising:
    at least one memory operable to store a historical transaction value for past transactions associated with related promissory payments;
    a communications interface operable to receive, via a network, a request from a merchant to determine authorization of a financial transaction associated with a proffered promissory payment; and
    a risk assessment filter which determines based on the historical transaction value and whether a merchant has authorized simplified risk assessment whether to authorize the financial transaction based on a more detailed risk score or whether to authorize the financial transaction based on absence of negative data stored in a negative database.

9. The system of claim 8 wherein the financial transaction is authorized based on the absence of negative data stored in the negative database when the historical transaction value meets a threshold.

10. The system of claim 8 wherein the financial transaction is authorized based on the more detailed risk assessment that calculates a risk score for the proffered promissory payment when the historical transaction value does not meet a threshold.

11. The system of claim 8 wherein the financial transaction is authorized based on the more detailed risk assessment that calculates a risk score for the proffered promissory payment when a value of the financial transaction exceeds a transaction limit set by the merchant.

12. The system of claim 8 wherein the risk assessment filter is further operable to determine based on criteria set by the merchant whether to authorize the financial transaction based on the more detailed risk assessment or whether to authorize the financial transaction based on absence of negative data stored in a negative database.

13. The system of claim 8 wherein the risk assessment filter is further operable to:
    identify an indication of whether funds were available for past authorized transactions associated with related promissory payments;
    determine to authorize the financial transaction based on the more detailed risk assessment that calculates a risk score for the proffered promissory payment when the indication is negative; and
    determine to authorize the financial transaction based on absence of negative data in the negative database when the indication is positive.

14. The system of claim 8 wherein the risk assessment filter is further operable to:
    identify an account status of a promissory account associated with the proffered promissory payment;
    determine to authorize the financial transaction based on the more detailed risk assessment that calculates a risk score for the proffered promissory payment when the account status is negative; and
    determine to authorize the financial transaction based on absence of negative data in the negative database when the account status is positive.

15. A computerized system for determining authorization of a financial transaction comprising:
    means for maintaining a historical transaction value for past transactions associated with related promissory payments;
    means for receiving, via a network, a request to determine authorization of a financial transaction associated with a proffered promissory payment;

means for accessing the historical transaction value associated with the related promissory payments; and means for determining, based on the historical transaction value, to authorize the financial transaction based on absence of negative data for the customer associated with the promissory payment stored in a negative database when the merchant has authorized simplified risk assessment; or performing a more detailed risk assessment based on a plurality of factors associated with the financial transaction when the merchant has not authorized simplified risk analysis or when negative data associated with the customer appears in the negative database.

16. The system of claim 15 further comprising means for authorizing the financial transaction based on the data stored in the negative database when the historical transaction value meets a threshold.

17. The system of claim 15 further comprising means for authorizing the financial transaction based on the more detailed risk assessment that calculates a risk score for the proffered promissory payment when the historical transaction value does not meet a threshold.

18. The system of claim 15 further comprising means for authorizing the financial transaction based on the more detailed risk assessment that calculates a risk score for the proffered promissory payment when a value of the financial transaction exceeds a transaction limit.

19. The system of claim 15 further comprising:

means for maintaining an indication of whether funds were available for past authorized transactions associated with the related promissory payments;

means for accessing the indication;

means for authorizing the financial transaction based on the more detailed risk assessment, wherein the risk assessment calculates a risk score for the proffered promissory payment when the indication is negative; and means for authorizing the financial transaction based on data in the negative database when the indication is positive.

20. The system of claim 15 further comprising:

means for accessing an account status of a promissory account associated with the proffered promissory payment;

means for authorizing the financial transaction based on the more detailed risk assessment, wherein the risk assessment calculates a risk score for the proffered promissory payment when the account status is negative; and means for authorizing the financial transaction based on data in the negative database when the account status is positive.

* * * * *